Aug. 31, 1965  A. SABATINO  3,203,677
BATTERY FLAMING DEVICE
Filed March 15, 1963  3 Sheets-Sheet 1

INVENTOR.
Anthony Sabatino
BY
*Gerrit D. Foster*
Attorney

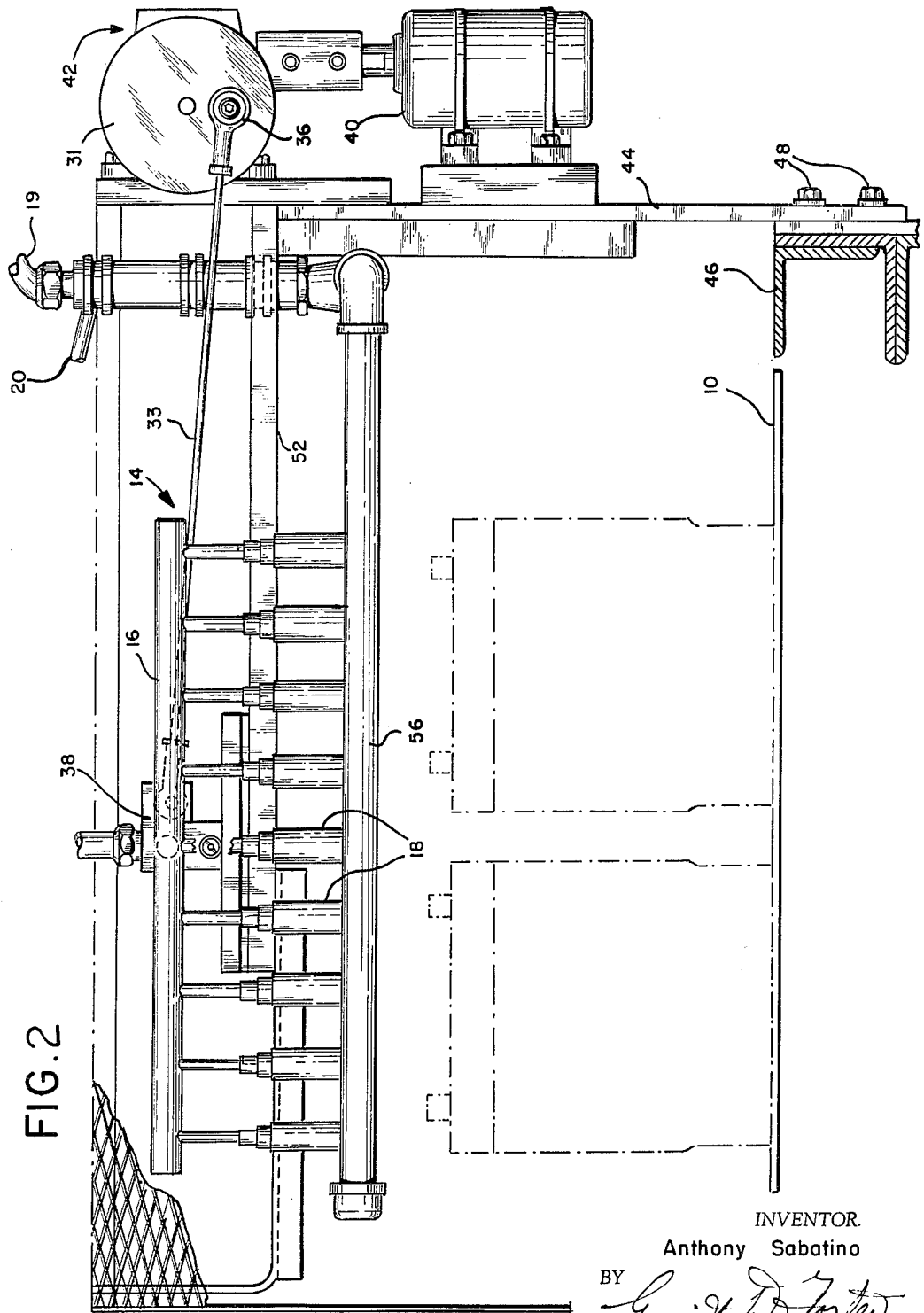

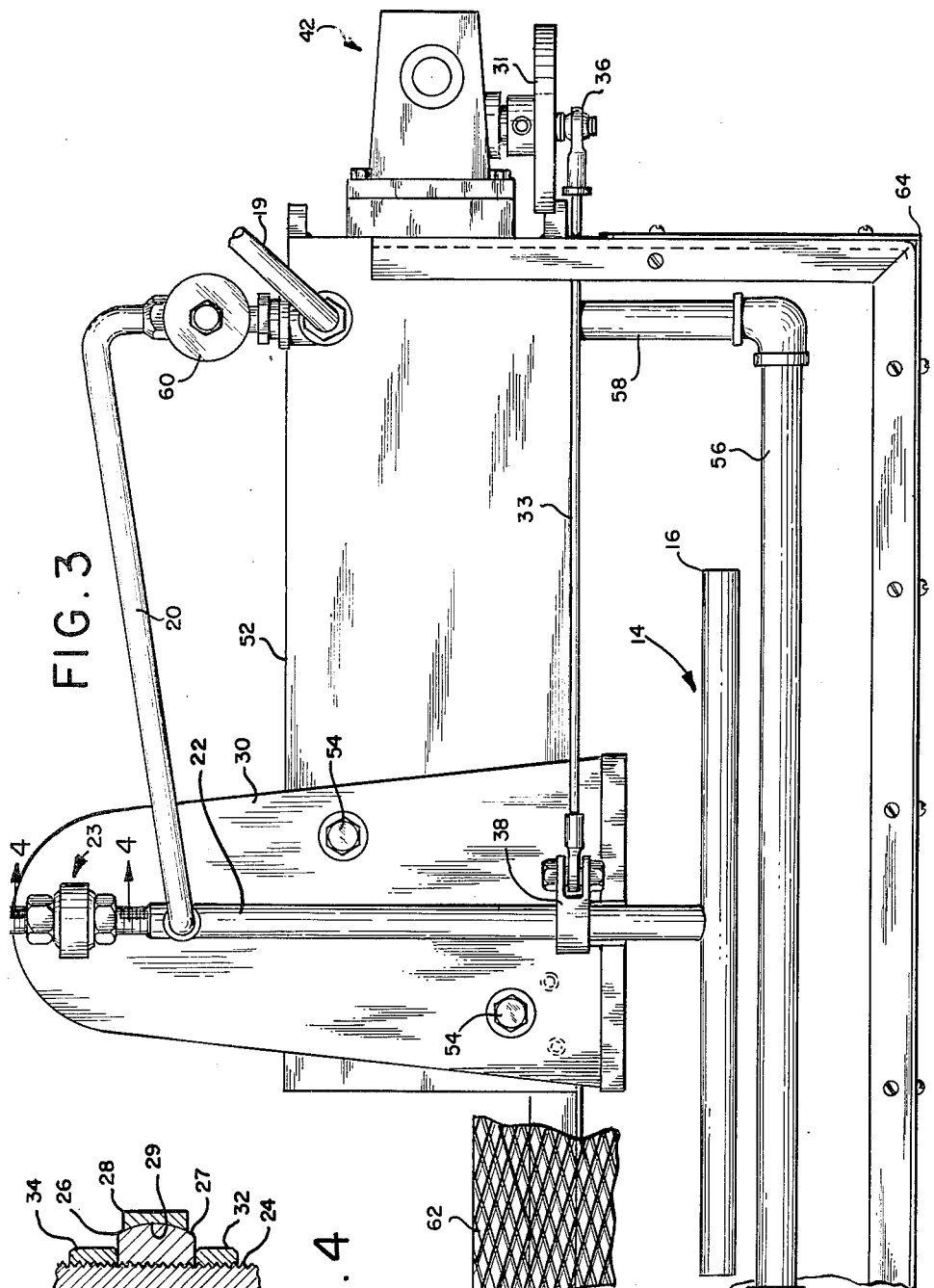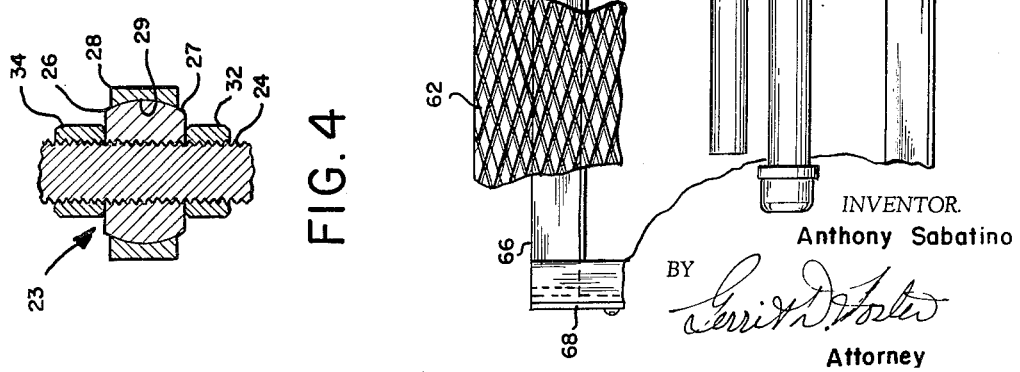

United States Patent Office 3,203,677
Patented Aug. 31, 1965

3,203,677
BATTERY FLAMING DEVICE
Anthony Sabatino, Milwaukee, Wis., assignor to Globe-Union Inc., Milwaukee, Wis., a corporation of Delaware
Filed Mar. 15, 1963, Ser. No. 265,533
13 Claims. (Cl. 263—6)

This invention relates to the manufacture of electric batteries.

A step in manufacturing of some types of electric batteries is the application of a suitable sealing compound to the top of the battery to seal the cover to the case to seal other joints in the cover and to provide a protective coating for battery components at the new cover which would otherwise be exposed. By way of example, an asphalt compound having a melting point of approximately 160°–300° F. is applied to the battery cover and, after application, it is heated to eliminate bubbles and to cause the asphalt to flow evenly and intimately adhere to the case and cover for an improved seal, for example with the formation of a suitable meniscus with the various surfaces at the battery cover.

One of the principal objects of this invention is the provision of an improved and highly effective device for heating the sealing compound after it has been applied to the battery.

Another object of this invention is to provide a device which applies heat to the sealing compound in an amount sufficient to effect an optimum seal while minimizing the danger of damage to the battery due to the application of heat.

For the achievement of these and other objects, this invention contemplates the mounting of a burner adjacent a conveyor for transporting batteries having a sealing compound applied thereto. The burner and conveyor are arranged for relative movement, with the burner oscillating in a plane parallel to the conveyor so that the heat from the burner is uniformly applied across the top of the batteries to heat the sealing compound. Preferably, the burner is elongated and is positioned with its longitudinal axis extending transversely of the direction of travel of the conveyor and the burner is then moved transversely of the conveyor direction of travel. With this arrangement a soft flame can be used to achieve optimum heating with a minimum danger of damage to the battery. To further minimize the danger of heat damage to the batteries, a control is included in the fuel supply mechanism which is operative, in response to stoppage of the conveyor, to interrupt the supply of fuel to the burner. Moreover, the fuel supply mechanism is constructed with a minimum fuel holding capacity so that the burner is extinguished practically instantaneously with stoppage of the conveyor.

Other objects and advantages will be pointed out in, or be apparent from, the specification and claims, as will obvious modifications of the embodiments shown in the drawings, in which:

FIG. 2 is a front elevation thereof;

FIG. 3 is a top plan view thereof; and

FIG. 4 is a section view generally along lines 4—4 of FIG. 3.

Figure 1:
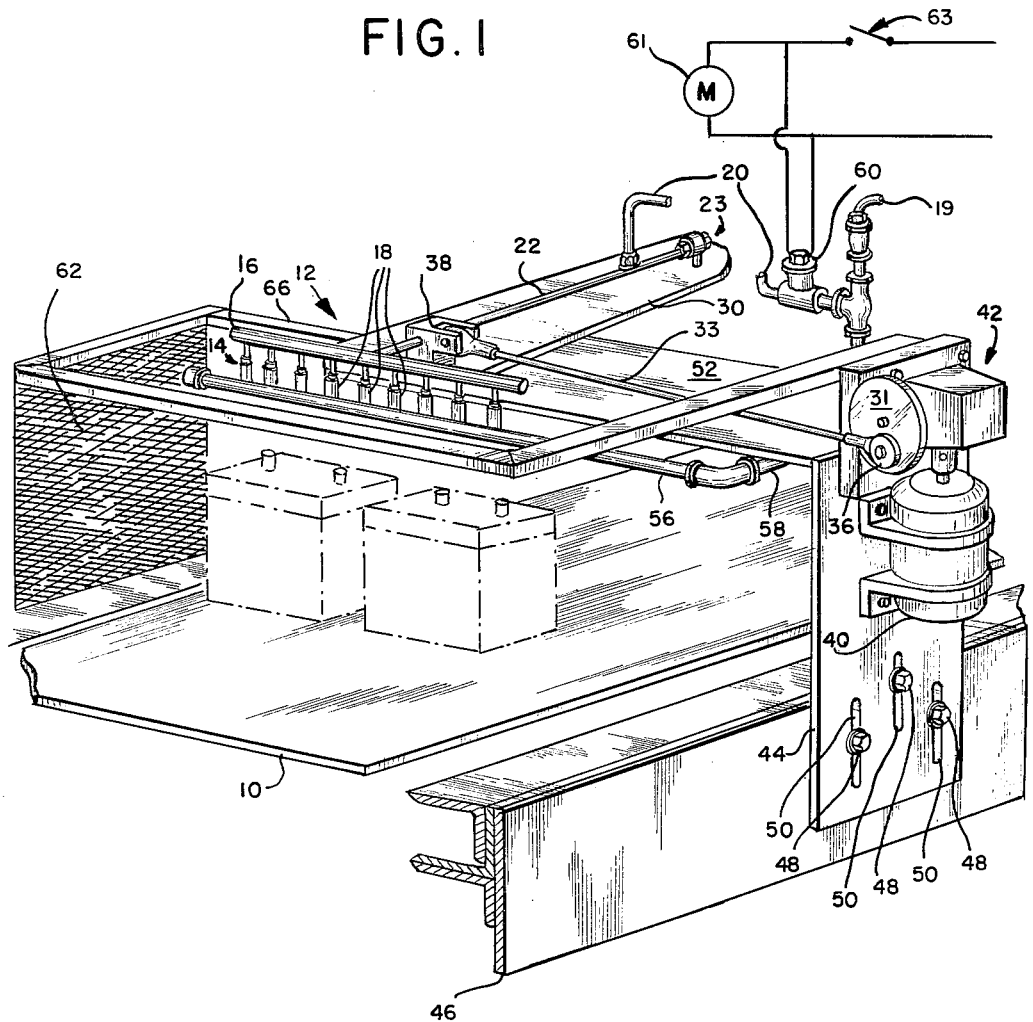
FIG. 1 is a perspective view of a preferred embodiment of this invention.

With particular reference to the drawings, batteries (illustrated by the phantom lines in FIG. 2) are transported on a horizontal conveyor 10 past a flaming device 12. The batteries have a suitable asphalt sealing compound (not shown) applied to the top thereof in accordance with procedures well known in the art. The flaming device 12 applies a flame to and heats the sealing compound to eliminate bubbles and to cause the asphalt compound to flow and intimately engage and seal the cover and case surfaces.

Flaming device 12 includes a main burner assembly 14 comprising an elongated manifold 16 and separate burners 18 depending from the manifold. Gas, or other suitable fuel, is supplied to the manifold from a main supply line 19 through a flexible supply line 20 and a rigid supply pipe 22. Supply pipe 22 is pivotally mounted on a fixed bracket 30 by a pivot joint 23. The pivot joint comprises a bearing member 26 having a generally spherical surface 27 which is received in a second bearing member 28 having a mating inner spherical surface 29. Bearing member 28 is mounted in fixed relation on support bracket 30 and bearing member 26 is threaded onto a threaded portion 24 of the supply pipe 22 with lock nuts 32 and 34 positively holding bearing member 26 in position on the supply pipe. Thus, supply pipe 22 provides both support for burner assembly 14 and also cooperates in transporting fuel thereto. Pivot joint 23 permits the burner assembly 14 to be pivoted in a generally horizontal plane and generally transversely of the direction of travel of conveyor 10.

An eccentric drive is provided for oscillating the burner assembly 14 transversely of the conveyor. The eccentric drive includes a rotatable disk 31 and a connecting rod 33 having an eccentric connection 36 on the rotatable disk and extending to a bracket 38 which connects rod 33 to supply pipe 22. A motor 40 rotates disk 31, through a suitable drive arrangement 42, to produce the oscillatory movement of the burner assembly.

The use of an elongated burner is preferred since this presents an elongated flame to the sealing compound. The elongated flame is moved transversely of the direction of travel of the conveyor and hence plays in a line across the tops of the batteries so that a soft, low intensity flame can be used at each of the burners and still effect optimum heating. Furthermore, an elongated flame oscillated in a plane parallel to the direction of travel of the batteries results in the application of heat of even intensity over the entire battery top to insure that all areas of the sealing compound are adequately and uniformly heated. Thus, a low intensity soft flame can be utilized which minimizes the danger of damage due to heat application while still maintaining and insuring adequate application of heat for optimum sealing and heating results.

Bracket 30 is connected to a horizontal mounting plate 52 by bolts 54, the horizonteal mounting plate is in turn connected to a vertical mounting plate 44. Mounting plate 44 is connected to a fixed frame 46 by bolts 48 which extend through slots 50 in the vertical mounting plate for engagement with the fixed frame. It will be noted that motor 40, its drive mechanism 42 and the rotatable disk 31 are connected to and movable with the vertical mounting plate 44. With this arrangement the vertical height of the burner assembly above the battery can be adjusted as desired and the drive for oscillating the burner assembly is moveable with the burner to maintain a simplified construction.

Turning now to the fuel supply arrangement for burner assembly 14, a solenoid valve 60 is included between flexible supply line 20 and main supply line 19. As is illustrated schematically in FIG. 1, solenoid valve 60 is connected in the control circuit in pararllel circuit relationship with motor 61 which drives conveyor 10. When motor 61 is de-energized, due to opening of switch 63, or a power failure, and conveyor 10 comes to rest the solenoid valve will be de-energized to interrupt the supply of fuel to burner assembly 14. It will be appreciated that any of a number of well known control connections can be used to effect interruption of the fuel supply when the conveyor is stopped. Although the conveyor may stop the burners will still be moving across the tops of the batteries with a pair of batteries stationary thereunder which could damage the batteries if allowed to exist for any prolonged length of time. As a solution to this problem and in addition to interrupting the flow of fuel by deenergizing the solenoid, flexible supply line 20, rigid supply pipe 22 and the burner assembly 14 are constructed to have a predetermined, minimum fuel holding capacity so that when the supply of gas to the burners is interrupted the amount of gas remaining in the line will be insufficient to support prolonged combustion and the burners will be extinguished practically instantaneously upon the interruption of the supply of fuel thereto. As an example, operating at a gas pressure of approximately 2–5 pounds and with the flexible line, the supply pipe and the manifold having approximate lengths of 20, 15 and 15 inches, respectively, an internal diameter of approximately ⅛ inch for the flexible line, supply line and the manifold has given satisfactory results. It will be appreciated that these figures can be varied depending upon the particular application.

A pilot burner 56 is positioned adjacent burners 18 and is operative to ignite the burners. Fuel to pilot 56 is supplied from the main supply line 19 through a connecting pipe 58. It will be appreciated that other means of ignition could be used, as desired, and without departing from the scope of this invention.

Screening 62, only a portion of which is shown in the drawings, surrounds the burner assembly to isolate the burner for safety reasons. The screening is supported by a bracket including an L-shaped arm 64 connected to vertical mounting plate 44, a support arm 66 connected to mounting plate 52 and an arm 68 connecting arms 64 and 66.

In accordance with this invention a flaming device is provided which applies a soft, low intensity flame to the asphalt sealing compound on the top of a battery, with the heat being applied with uniformity across the top of the battery. The flaming device produces an elongated flame which is moved transversely of the direction of travel of the battery to supply sufficient heat for raising the temperature of the asphalt compound without the danger of damage due to prolonged application of heat. Furthermore, a safety control is provided which is effective to extinguish the burner if the conveyor should be stopped which might be below the burner.

Although this invention has been illustrated and described in connection with particular embodiments thereof, it will be apparent to those skilled in the art that various changes and modifications may be made therein without departing from the spirit of the invention or from the scope of the appended claims.

What I claim is:

1. Apparatus in combination with a moving conveyor and adapted to apply heat to battery sealing compound on batteries being transported on said conveyor, said apparatus comprising, in combination, generally elongated burner means;

means supporting said burner means adjacent the path of movement of and directed toward said conveyor with the longitudinal axis of said burner means disposed in a plane parallel to the direction of said path of movement, said supporting means further operative to support burner means for movement in said plane so that said burner means is movable parallel to said path of movement; and means for oscillating said burner means in said plane so that said burner means is adapted to move relative to batteries on said conveyor with uniform spacing from said batteries.

2. Apparatus in combination with a moving generally horizontal conveyor and adapted to apply heat to battery sealing compound on batteries being transported on said conveyor, said apparatus comprising, in combination, generally elongated burner means;

means supporting said burner means in a horizontal position above and directed toward said conveyor and further supporting said burner means for movement in a horizontal plane; and means for oscillating said burner means in said plane so that said burner means is adapted to move across batteries on said conveyor in uniform spaced relationship from said batteries.

3. The apparatus of claim 2 including supply means for supplying fuel to said burner means, and control means connected with the drive for said conveyor and operative to interrupt the flow of fuel through said supply means to said burner means when said conveyor drive is interrupted, said supply means having an interior dimension defining its fuel carrying capacity and said interior dimension characterized by affording a predetermined minimum fuel capacity such that said burner means is extinguished practically instantaneously with interruption of the supply of fuel through said pipe means.

4. A battery flaming device in combination with a moving conveyor and adapted to apply heat to battery sealing compound on batteries being transported on said conveyor, said flaming device comprising, in combination, generally elongated burner means positions adjacent to and directed toward said conveyor with the longitudinal axis of said burner means disposed in a plane parallel to the path of movement of said conveyor;

bracket means fixed relative to said conveyor;

a generally hollow elongated member pivotally connected at one end to said bracket means and arranged for movement about said one end in a plane parallel to and in a direction generally transverse to said path of movement, said hollow member also connected to and supporting said burner means for movement therewith and to supply fuel thereto so that said hollow member both supplies fuel to and supports said burner means; and drive means connected with and operative to oscillate said hollow member and said burner means parallel with and transverse to said path of movement so that said burner means moves across batteries on said conveyor and in uniform spaced relationship from said batteries.

5. The battery flaming device of claim 4 including supply means connected to said hollow member for supplying fuel to said burner means through said hollow member, and also including control means connected with the drive for said conveyor and operative to interrupt the flow of fuel through said supply means when said conveyor drive is interrupted, said supply means and said hollow member having an interior dimension defining their fuel carrying capacity and said interior dimension characterized by affording a predetermined minimum fuel capacity so that said burner means is extinguished practically instantaneously with the interruption of the supply of fuel through said supply means and said hollow member.

6. A battery flaming device in combination with a moving conveyor and adapted to apply heat to battery sealing compound on batteries being transported on said conveyor, said flaming device comprising, in combination, burner means disposed above and directed toward said conveyor;

bracket means supported adjacent said conveyor;

a generally hollow elongated member connected to said burner means and having its longitudinal axis extending generally parallel to the direction of travel of said conveyor;

means connecting said hollow member to said bracket means and supporting said hollow member for pivotal movement in a plane parallel to said direction of travel;

drive means for moving said hollow member in said plane transverse to the direction of travel of said conveyor so that said burner means moves across batteries on said conveyor and in uniform spaced relationship from said batteries; and fuel supply means including said hollow member connected to and supplying fuel to said burner means.

7. The flaming device of claim 6 wherein said fuel supply means includes control means connected with the drive for said conveyor and operative to interrupt the flow of fuel to said burner means when said conveyor drive is interrupted and wherein the portion of said fuel supply means on the burner means side of said control means has an interior dimension defining its fuel carrying capacity and said interior dimension is characterized by affording a predetermined minimum fuel carrying capacity so that said burner means is extinguished practically instantaneoulsy with interruption of said conveyor drive.

8. The flaming device of claim 7 wherein said burner means comprises a manifold portion connected to said hollow member and a plurality of depending separate burner members.

9. The combination with an elongated horizontally moving conveyor adapted to transport a plurality of batteries having a sealing compound applied to the top portion thereof, a flaming device comprising, a bracket disposed above said conveyor;

a generally hollow elongated horizontally disposed member extending generally in the direction of travel of said conveyor;

means pivotally supporting said hollow member on said bracket for movement in a horizontal plane and in a direction generally transverse to said direction of travel;

generally elongated burner means disposed adjacent to and directed toward said conveyor, said burner means connected to and movable with said hollow member and disposed transversely relative to said hollow member so that its longitudinal axis is disposed generally transversely of and parallel to the path of movement of said conveyor;

drive means connected to said hollow member for oscillating said hollow member in said horizontal plane to be adapted to move said burner means horizontally across batteries on said conveyor and in uniform spaced relationship from said batteries; and means connected to said hollow member for supplying fuel through said hollow member to said burner means.

10. The combination of claim 9 including means supporting said bracket and said burner means for joint adjustable vertical movement relative to said conveyor.

11. The combination of claim 9 including pilot burner means adjacent to said burner means.

12. The combination of claim 9 wherein said fuel supply means includes control means connected with the drive for said conveyor and operative to interrupt the flow of fuel to said burner means when the conveyor drive is interrupted, and flexible supply means connecting said control means to said hollow member, said flexible supply means and said hollow member characterized by an interior dimension defining the fuel carrying capacity thereof and said interior dimension characterized by affording a predetermined minimum fuel carrying capacity so that said burner means is extinguished practically instantaneously with interruption of said conveyor drive.

13. The combination of claim 9 including means connecting said drive means to said burner means for movement therewith so that said flaming device is vertically adjustable as a unit.

References Cited by the Examiner

UNITED STATES PATENTS

| | | | |
|---|---|---|---|
| 2,016,125 | 10/35 | Snow | 263—8 |
| 2,152,554 | 3/39 | Lockwood | 263—8 |
| 2,243,390 | 5/41 | Mercier | 263—8 X |
| 2,380,329 | 7/45 | Price | 263—8 |
| 2,388,762 | 11/45 | Powers | 263—8 |
| 2,541,695 | 2/51 | Gangewere | 158—2 X |
| 2,651,702 | 9/53 | Burke et al. | 263—2 X |
| 2,984,298 | 5/61 | Heiser | 263—33 |

CHARLES SUKALO, *Primary Examiner.*

JOHN J. CAMBY, *Examiner.*